June 6, 1967 J. T. GEREKE 3,323,706
COMBINATION LIQUID AND FOOD PARTICLE CONTAINER
Filed Aug. 13, 1965 2 Sheets-Sheet 1

INVENTOR.
JACK T. GEREKE
BY
*Fishburn & Gold*
ATTORNEYS

June 6, 1967  J. T. GEREKE  3,323,706
COMBINATION LIQUID AND FOOD PARTICLE CONTAINER
Filed Aug. 13, 1965  2 Sheets-Sheet 2
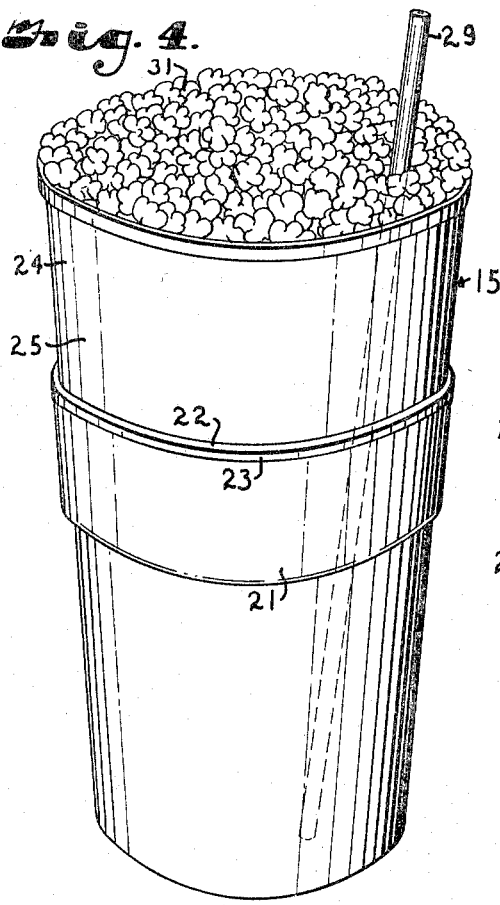
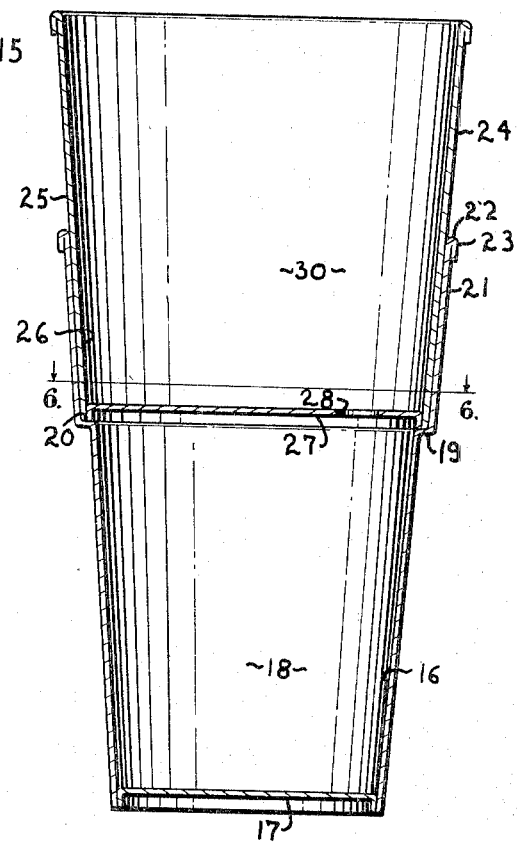
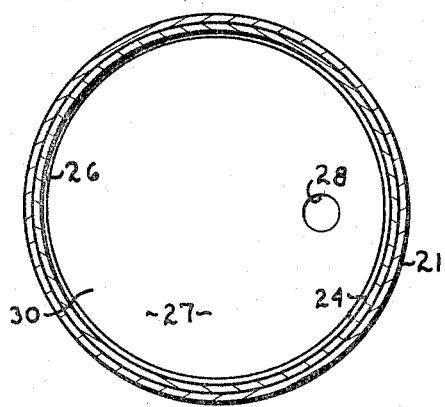
INVENTOR.
JACK T. GEREKE
BY
Fishburn & Gold
ATTORNEYS

United States Patent Office 3,323,706
Patented June 6, 1967

3,323,706
COMBINATION LIQUID AND FOOD PARTICLE
CONTAINER
Jack T. Gereke, 830 W. 53rd St.,
Kansas City, Mo. 64112
Filed Aug. 13, 1965, Ser. No. 479,577
4 Claims. (Cl. 229—15)

ABSTRACT OF THE DISCLOSURE

A container having a partition about midway of the height thereof forms a lower compartment for a beverage and an upper compartment for a food, such as popcorn or the like, the partition having an opening for receiving a tubular member, such as a straw, for withdrawing the beverage from the lower compartment while the food is still in the upper compartment.

This invention relates to a container for holding a beverage and a food product such as popcorn and dispensing the same therefrom from the same container adapted to be held in one hand.

It has been common practice to sell packages of popcorn and soft drinks in paper containers at various amusement places, but generally they are in separate containers wherein it requires both hands of the user to carry the same. This is particularly unhandy when in a theatre or the like where both hands would be engaged in carrying and supporting the containers and one person then would have difficulty eating the popcorn or the product from the container.

The principal object of the present invention is to provide a combination container for beverage and popcorn wherein they both may be carried by one hand of the user and the liquid dispensed therefrom through a tubular member or straw and the popcorn by the free hand of the user.

Other objects of the present invention are to provide a container having a lower compartment and a partition dividing the lower compartment from an upper compartment and the partition having an opening for a tubular member to be inserted through the upper compartment and through the partition into the lower compartment.

Still further objects of the present invention are to make a container from treated paper such as drinking cups are made of and the wall of the container has an annular groove or concave portion around substantially the middle thereof and a flat paper partition of slightly larger diameter than the diameter of the walls of the container is provided for insertion through the upper compartment of the container so that when it is pressed into the concaved annular portion, it will remain therein and support the popcorn or other food product thereabove.

Still further objects of the present invention are: to provide a two-piece container for the purpose hereinabove described wherein the lower container or compartment for the beverage has an offset laterally extending portion and upwardly extending walls thereabove and wherein a second compartment or container is adapted to telescopingly fit within the top of the first container and the bottom edge thereof rests on the laterally outwardly extending portion of the lower container and to provide the bottom of the upper compartment with an opening for receiving a tubular member through which the liquid may be drawn from the lower compartment.

A further object of the invention is to provide a container of this character which may be disposable after one use and which is simple and economical to manufacture.

Other objects and advantages of this invention will become apparent from the following description taken in connection with the accompanying drawings wherein are set forth by way of illustration and example certain embodiments of this invention.

FIG. 4 is a perspective view of a modified form of the invention.

FIG. 5 is a vertical cross-sectional view therethrough.

FIG. 6 is a cross-sectional view taken on line 6—6, FIG. 5.

Figure 1:
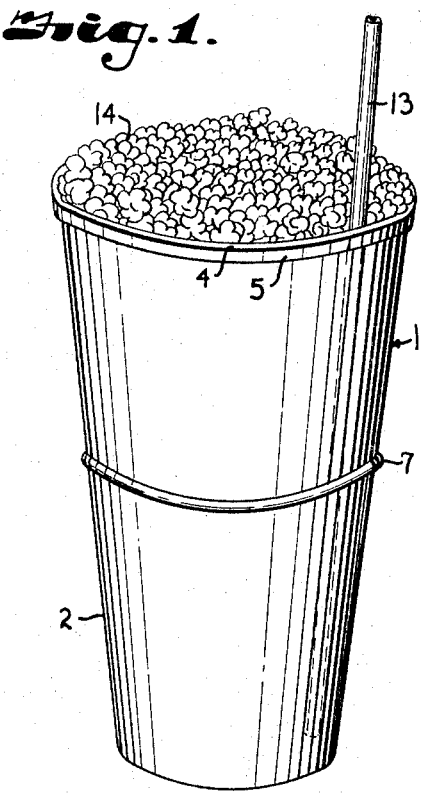
FIG. 1 is a perspective view of my invention showing the upper compartment having popcorn therein and the tubular member or straw inserted therethrough into the lower compartment.

Referring more in detail to the drawings:

The numeral 1 designates a container embodying the features of my invention usually made of paper or another disposable material although it may be made of plastic or any other suitable material. The container is here shown to be in one piece and having walls 2 tapered inwardly from the upper to the lower portion. The container 1 has a bottom 3 and the upper edge portion 4 is turned over forming a rim 5. Substantially midway longitudinally of the container 1, I have provided an annular groove or concave portion 6 in the form of a convex portion 7 on the outside of the wall 2 of the container. A flat partition member 8 is provided for engaging in the concave portion 5 to separate the container into a lower compartment 9 and an upper compartment 10. It will be obvious the partition member 8 should be slightly larger than the inside diameter of the container as indicated at 11 so that it will fit into and be retained by the concaved or grooved portion 6. The partition 8 is provided with an opening 12 through which a tubular member 13 such as a straw or the like is engaged and which extends into the compartment 9, as illustrated in FIG. 1 in dotted lines.

Figure 2:
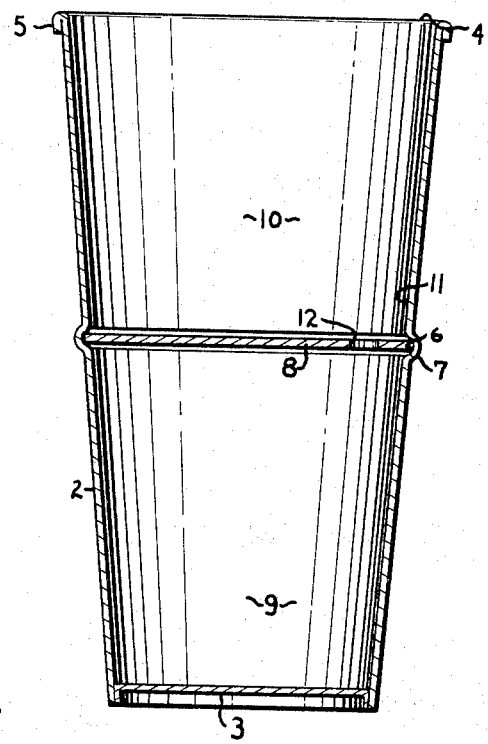
FIG. 2 is a vertical cross-section taken on line 2—2, FIG. 3.
Figure 3:
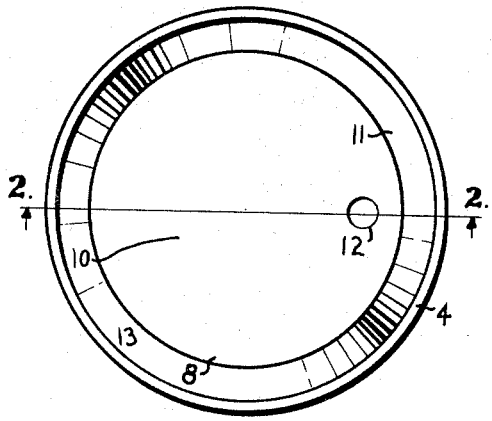
FIG. 3 is a cross-sectional view particularly illustrating the partition in the container.

When in use, the lower compartment 9 may be filled or partially filled with a liquid or beverage (not shown) and the partition 8 inserted in the container 1 until it comes to rest in the concaved or grooved portion 6, as illustrated in FIG. 2. The tubular member 13 is inserted through the compartment 10 and the opening 12 in the partition 8 into the compartment 9. Popcorn or other edible food may then be placed in the compartment 10 around the tubular member 13.

It will be obvious from the foregoing that the container with both the liquid and the popcorn, as indicated at 14, may be transported with one hand and the other hand of the user left free.

FIGS. 4, 5 and 6 illustrate another form of the invention wherein there is provided a container 15 having tapered side walls 16 and a bottom 17, thus forming a compartment 18 for liquid or the like (not shown). The walls 16 of the container are laterally extended outwardly as indicated at 19 forming a shoulder 20 above the compartment 18. The walls 16 are extended upwardly from the shoulder 20 as indicated at 21 and the upper edge 22 turned downwardly forming a rib 23 therearound. A container 24 is provided having tapered walls 25 of slightly less diameter than the diameter of the wall 21 above the shoulder 20 of the upper portion of the lower container and is adapted to telescope therein as indicated at 26 (FIG. 5). The upper container has a bottom 27 provided with an opening near one side thereof as indicated at 28 through which a tubular member or straw 29 may be inserted into the lower compartment 18, thus forming an upper compartment 30 for popcorn or the like 31 or other edible food product. The straw 29 is indicated in dotted lines in FIG. 4.

When in use, the liquid such as a beverage or the like is poured into the compartment 18, the upper container 30 is then placed within the walls 20 of the upper portion of the lower container and telescopingly fitted therein. The tubular member 29 is inserted through the upper compartment and through the opening 28 and the bottom 27 thereof and into the lower compartment 18. The popcorn 31 or other edible food is filled into the upper compartment 30 and is ready for use.

It will be obvious from the foregoing that I have provided an improved container for holding a liquid beverage and edible food product which may be carried in one hand of the user and leaving the other hand free for other purposes. Such a container is much easier for one person to carry at a theatre, ball games or other places of amusement where beverages are sold along with popcorn or other edible food products. The beverage may be sipped from the straw and the one hand free to eat the food product from the upper compartment.

It is contemplated that the paper of the container, and particularly the bottom compartment, will be sufficiently waterproof to contain ice as well as the beverage and maintain the same therein for a sufficient length of time to consume the product.

It is to be understood that while I have illustrated and described certain forms of my invention, it is not to be limited to the specific form or arrangement of parts herein described and shown except insofar as such limitations are included in the claims.

What I claim and desire to secure by Letters Patent is:

1. A combination beverage and particle form confectioner container adapted to be carried in one hand comprising,
   (a) an elongated paper carton having side walls and a closed bottom and an open top, said side walls being tapered from the top toward said bottom and having an annular groove in said walls about midway between said top and bottom,
   (b) a flat partition having an opening near one side thereof engaging in said annular groove and separating said carton into a lower compartment for containing beverage and an upper compartment for containing said particle from confection, and
   (c) an elongated tubular member extending through said upper compartment and said opening in said partition and into said beverage compartment.

2. The combination of claim 1 wherein said partition is removable.

3. A combination beverage and particle form confectioner container adapted to be carried in one hand comprising,
   (a) an elongated paper carton having side walls and a closed bottom and an open top forming a bottom compartment for a liquid, said side walls being offset laterally forming an annular shoulder therearound spaced from said open top,
   (b) a second elongated paper carton having side walls adapted to telescopically engage in the upper portion of said first carton forming an upper compartment for a particle form confection, said second carton having a bottom provided with an opening therethrough, and
   (c) an elongated tubular member extending through said upper compartment and said opening in said bottom thereof and into said beverage compartment.

4. The combination of claim 3 wherein said opening in the bottom of said upper compartment is near one edge thereof.

References Cited
UNITED STATES PATENTS

| | | | |
|---|---|---|---|
| 1,137,039 | 4/1915 | Weber | 206—47 |
| 1,665,289 | 4/1928 | Weaver | 229—15 |
| 2,287,610 | 6/1942 | Guidry | 229—15 |
| 2,740,575 | 4/1956 | Fontaine | 229—15 |
| 3,288,344 | 11/1966 | Woollen et al. | 229—15 |

FOREIGN PATENTS 820,702  11/1951  Germany.

JOSEPH R. LECLAIR, *Primary Examiner.*

D. T. MOORHEAD, *Assistant Examiner.*